United States Patent
Huang et al.

(10) Patent No.: US 10,260,763 B2
(45) Date of Patent: Apr. 16, 2019

(54) METHOD AND APPARATUS FOR RETROFITTING AN AIR CONDITIONING SYSTEM USING ALL-WEATHER SOLAR HEATING

(71) Applicant: HUNAN DONGYOU WATER VAPOR ENERGY HEAT PUMP MANUFACTURING CO., LTD., Huaihua (CN)

(72) Inventors: Guohe Huang, Changsha (CN); Nianping Li, Changsha (CN); Jianlin Cheng, Changsha (CN); Ruohuang Li, Changsha (CN); Tianfei Huang, Changsha (CN); Zhongwei Li, Changsha (CN); Liping Xiang, Changsha (CN); Haijiao Cui, Changsha (CN); Yao Liu, Changsha (CN); Jun Tong, Changsha (CN); Jianliang Li, Changsha (CN)

(73) Assignee: HUNAN DONGYOU WATER VAPOR ENERGY HEAT PUMP MANUFACTURING CO., LTD., Huaihua (CN)

( * ) Notice: Subject to any disclaimer, the term of this patent is extended or adjusted under 35 U.S.C. 154(b) by 0 days.

(21) Appl. No.: 15/551,389

(22) PCT Filed: Mar. 28, 2016

(86) PCT No.: PCT/CN2016/077586
§ 371 (c)(1),
(2) Date: Aug. 16, 2017

(87) PCT Pub. No.: WO2016/155600
PCT Pub. Date: Oct. 6, 2016

(65) Prior Publication Data
US 2018/0031254 A1   Feb. 1, 2018

(30) Foreign Application Priority Data

Mar. 27, 2015 (CN) .......................... 2015 1 0139029

(51) Int. Cl.
*F24D 5/12* (2006.01)
*F24F 3/06* (2006.01)
(Continued)

(52) U.S. Cl.
CPC ............ *F24F 5/0046* (2013.01); *F24F 3/065* (2013.01); *F24F 11/76* (2018.01); *F25B 29/003* (2013.01);
(Continued)

(58) Field of Classification Search
CPC .......... F24F 5/0046; F24F 11/76; F24F 3/065; F24F 2005/0064; F25B 29/003; F24D 5/12
(Continued)

(56) References Cited

U.S. PATENT DOCUMENTS 3,782,132 A * 1/1974 Lohoff ................. F24F 5/0003
                                                165/168
4,024,908 A * 5/1977 Meckler ............... F24F 5/0046
                                                165/225
(Continued)

FOREIGN PATENT DOCUMENTS

CN         101349451          1/2009
CN         202835915          3/2013
(Continued)

OTHER PUBLICATIONS

First Office Action and the First search dated Dec. 12, 2016 with English translation from corresponding application No. CN 201510139029.2.
(Continued)

*Primary Examiner* — Justin M Jonaitis
(74) *Attorney, Agent, or Firm* — Hauptman Ham, LLP

(57) ABSTRACT

The invention discloses a method and apparatus for retrofitting air conditioning system using all-weather solar heating. In air conditioning system in which original single cold host is equipped with a cooling tower and a boiler, plate heat exchanger, solar collector plate, energy storage tank and circulating pipelines are provided. The cooling tower is used to absorb the heat in the winter air. The solar collector plate is used to absorb solar thermal heat and transfer to the plate heat exchanger. The single cold machine is used to absorb the heat of the antifreeze liquid. The plate heat exchanger is provided to form a secondary cycle so as to avoid icing risk of the antifreeze liquid. At the outdoor temperature more than five degrees, the indoor users is heated without operating the boiler, which maintains summer operation performance and meanwhile increases winter heating function without changing the original system.

5 Claims, 1 Drawing Sheet

(51) Int. Cl.
  *F24F 5/00*  (2006.01)
  *F24F 11/76*  (2018.01)
  *F25B 29/00*  (2006.01)
(52) U.S. Cl.
  CPC ........ *F24D 5/12* (2013.01); *F24F 2005/0064* (2013.01)
(58) Field of Classification Search
  USPC ..................................... 165/48.2, 58, 60, 61
  See application file for complete search history.

(56) References Cited

U.S. PATENT DOCUMENTS

| | | | | |
|---|---|---|---|---|
| 4,143,705 | A * | 3/1979 | Awalt, Jr. ................. | F24B 1/18 165/48.2 |
| 4,205,529 | A * | 6/1980 | Ko ........................ | F24F 3/1417 62/235.1 |
| 4,269,263 | A * | 5/1981 | Yukimachi .......... | F24D 11/0264 165/240 |
| 4,273,184 | A * | 6/1981 | Tanaka ................ | F24D 11/0221 62/235.1 |
| 4,457,358 | A * | 7/1984 | Kriege ...................... | F24F 3/06 165/50 |
| 4,522,253 | A * | 6/1985 | Levin .................. | F24D 11/0214 165/207 |
| 2010/0064699 | A1* | 3/2010 | Llurens ................ | F24F 5/0046 62/79 |
| 2014/0048244 | A1* | 2/2014 | Wallace .................. | F28F 27/00 165/253 |

FOREIGN PATENT DOCUMENTS

| | | |
|---|---|---|
| CN | 104075484 | 10/2014 |
| CN | 204027080 | 12/2014 |
| CN | 104728979 | 6/2015 |
| CN | 204629873 | 9/2015 |
| WO | WO2010050663 | 5/2010 |

OTHER PUBLICATIONS

International search report dated Jul. 5, 2016, and Written opinion dated May 7, 2016 from corresponding application No. PCT/CN2016/077586.
First Office Action and English translation from corresponding application No. CN 201510139029.2.
First search from corresponding application No. CN 201510139029.2.

\* cited by examiner

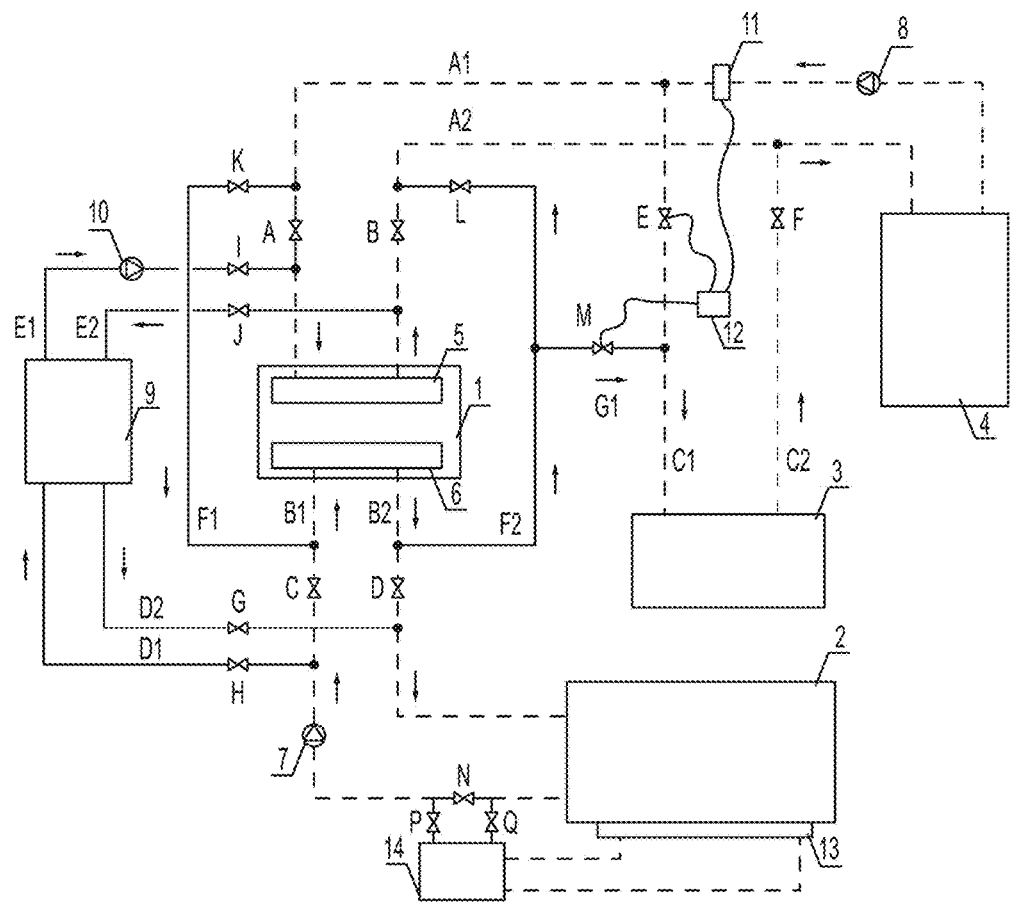

METHOD AND APPARATUS FOR RETROFITTING AN AIR CONDITIONING SYSTEM USING ALL-WEATHER SOLAR HEATING

RELATED APPLICATIONS

The present application is a National Phase of International Application Number PCT/CN2016/077586, filed Mar. 28, 2016, and claims the priority of China Application No. 201510139029.2, filed Mar. 27, 2015.

TECHNICAL FIELD

The present invention relates to the field of energy saving and energy utilization technology, and more particularly to a method and apparatus for retrofitting an air conditioning system for use in air conditioning heating industry.

BACKGROUND

At present, China's air-conditioning system has several types of cold and heat sources mainly as follows: 1. single cold air conditioning host with cooling tower and boiler air conditioning system; 2. various types of heat pump air conditioning system; 3. lithium bromide air conditioning system; 4. ice storage with other heat source air conditioning systems. Among them, in the summer, the single cold air conditioning host is used for refrigerating and cooling tower is used for radiating and in winter, the boiler is used for heating, which has the advantages that the application is flexible, it is not subject to constraints from project scale, and it has low initial investment and thus can be widely used in various types of buildings, but has the defect that the apparatus has idle time, the overall efficiency is not high, the boiler burns fossil energy and the exhaust has pollution. Various types of heat pump air conditioning system include air source heat pump, water source heat pump, ground source heat pump, sewage source heat pump. Among them, air source heat pump using outdoor air as a cold source is the most simple application with the advantages that it can be used both in winter and summer, the initial investment is low, it is a flexible application, but with the defect that the operation state is unstable, especially in the most adverse winter and summer environment, it has low efficiency, it maybe frost in winter and needs electric auxiliary heating for normal use. Water source heat pump use surface water and groundwater as the source of cold and heat sources in winter and summer, with the advantages that the operation is safe and reliable, the annual operation efficiency is high, but with the defect that it needs a stable and reliable water source near the building so that it can be used, and the current groundwater exploitation has been limited. Ground source heat pump has the advantages that the perennial operation condition is stable, the operation efficiency is high, the project operating costs is low, but has the defect that it needs large pre-construction land area, needs drilling and buried-pipe treatment, the project early investment is high, it is subjected largely to the geographical environment and geological conditions constraints. Lithium bromide air conditioning system using thermal energy as unit energy can also provide hot and cold water at the same time, with the advantages that the operational power consumption is low, waste heat can be used as energy, but with the defects that it requires large project volume, annual attenuation is larger, operating costs is higher and the management is inconvenient. Ice storage stores cooling capacity in the form of ice using low-cost electricity at night, releasing it when it needs cold supply during the day, with the advantages that the refrigerating temperature is low and stable, air conditioning effect is good, the operation is economic and simple, but with the defects that the initial investment is high, other heat source is needed for heating in the winter.

Comparing above conventional air conditioning cold and heat source, single cold air conditioning host with cooling tower and boiler air conditioning system is the most common and most widely used due to its outstanding advantages and occupies a large proportion in China's large and medium-sized building air conditioning system. In the summer, the single cold air conditioning host uses the compressor to compress the refrigerant, extract the heat of the chilled water in the user system and transfer it to the cooling water, then distribute it to the air by the cooling tower and thus continuously provide the user system with cooling capacity. In winter, boiler is used to supply water for heating to the user system, so as to provide heat for the user air conditioning system. In the south of the Qinling Mountains and the Huaihe River, there is no central heating in winter, and often a single building or building groups use central air conditioning system for heating. During the building using air conditioning period, the time period when the outdoor temperature is less than five degree is less, the boiler output is not full. In this system, the entire heating season uses boilers for heating. But the boiler combustion efficiency is low and the required fossil energy is non-renewable energy. In the combustion process, the exhaust contains sulfide, nitrides and other, substances causing environmental contamination. Every winter, the formation of air pollution and haze climate caused by the combustion of various boilers do great harm to human health. Therefore, boiler burning in the winter directly causes environmental pollution and energy waste, while in the winter single cold air conditioning host and cooling tower stop operating, resulting in equipment idle.

In the winter, the wet and cold air still has a certain temperature. For the environment with the temperature lower than the wet and cold air temperature, this wet and cold air is still an infinite heat source and the heat therein can be absorbed in a certain way. At the same time, solar thermal heat is pollution-free, environmentally friendly and efficient heat energy, and during the period in which winter sunshine is strong, the solar energy has not been applied in this air conditioning system, resulting in a great waste of energy.

Therefore, if the single cold air conditioning host and cooling tower are to be transformed so that during the period when the winter ambient temperature is higher than five degrees, the heat in the air is absorbed by using a single cold machine with cooling tower, making full use of solar thermal heat to form an all-weather solar air conditioning system to provide the user with air conditioning heating, which can greatly reduce the time of using boiler. At the same time, the cooling backwater in the single cold air conditioning host is heated by making full use of solar energy, improving the temperature of inflow water of the single cold machine and thus improving heating efficiency of the single cold machine. In this way, the single cold air conditioning host which is idle originally can be used as a high-efficiency heating host, while the pollution-free renewable energy is used, saving a lot of costs and reducing environmental pollution, and bringing a very important economic value and social value.

SUMMARY

In view of the above deficiencies of the prior art, it is an object of the present invention to overcome the shortcomings of the above-mentioned air conditioning system in which a single cold air conditioning host is equipped with cooling tower and boiler, and provide a method and an apparatus for retrofitting an air conditioning system which can be used in both winter and summer with high efficiency and replace boiler heating with the all-weather solar energy, by making full use of solar thermal heat and solar energy to convert the heat stored in the wet and cold air.

In order to achieve the above object, the present invention adopts the following technical solutions.

A method and apparatus for retrofitting an air conditioning system using an all-weather solar heating, comprising an original air conditioning system composed of a single cold air conditioning host, a cooling tower, a boiler, a user indoor air conditioning system, a evaporator, a condenser, a cooling water pump and a chilled water pump. The original air conditioning system is provided further with a plate heat exchanger, a secondary circulation pump, a temperature sensor, a controller, solar collector plate, energy storage tank; A primary water inlet of the plate heat exchanger is connected to the original cooling water return pipe through a first pipeline, and the connection point of the first pipeline and the cooling water return pipe is located the pipeline between the cooling water pump and the cooling water return valve; A primary water outlet of the plate heat exchanger is connected to the original cooling water supply pipe through a second pipeline, and the connecting point of the second pipeline and the cooling water supply pipe is located in the pipeline between the cooling water supply valve and the cooling tower; A secondary water outlet of the plate heat exchanger is connected to the original chilled water return pipe through a third pipeline, and the connection point of the third pipeline and the chilled water return pipe is located in the pipeline between the chilled water return valve and the evaporator; A secondary water inlet of the plate heat exchanger is connected to the original chilled water supply pipe through a fourth pipeline, and the connection point of the fourth pipeline and the chilled water supply pipe is located in the pipeline between the chilled water supply valve and the evaporation; A secondary circulation pump is mounted on the third pipeline connected to the secondary water outlet of the plate heat exchanger; A fifth pipeline is provided so that the chilled water return pipe is connected to the water inlet of the condenser of the single-cold air conditioning host, and the connection point of the fifth pipeline and the chilled water return pipe is located in the pipeline between the chilled water pump and the chilled water return valve; A sixth pipeline is provided so that the chilled water supply pipe is connected to the water outlet of the condenser of the single cold air conditioning host and the connection point of the sixth pipeline and the chilled water supply pipe is located in the pipe behind the chilled water supply valve; a solar heat collecting plate is provided on the outside of the tower wall of the cooling tower, and the solar heat collecting plate is connected with the energy storage tank through pipelines and the energy storage tank is installed on the cooling water return pipe between the cooling tower and the cooling water pump.

As a preferred technical solution of the invention, a seventh pipeline is provided between the sixth pipeline connecting the chilled water supply pipe and the water outlet of the condenser of the single cold air conditioning host and the boiler water return pipe, and a solenoid valve is mounted on the seventh pipeline, the connection point of the seventh pipeline and the boiler water return pipe is located in the pipeline between the boiler return valve and the boiler water inlet;

As a preferred technical solution of the invention, the boiler return valve is a solenoid valve;

As a preferred technical solution of the invention, the temperature sensor is mounted on the chilled water return pipe and is located at the water outlet of the chilled water pump.

As a preferred technical solution of the invention, the controller can adjust the opening degree of the boiler return valve and the solenoid valve.

As a preferred technical solution of the invention, the pipelines connected to the plate heat exchanger are filled with antifreeze liquid;

As a preferred technical solution of the invention, the chilled water return valve and the chilled water supply valve on the chilled water pipes are closed in summer and opened in summer;

As a preferred technical solution of the invention, the cooling water return valve and the cooling water supply valve on the cooling water pipes are closed in summer and opened in summer;

As a preferred technical solution of the invention, valves are provided in respect pipeline, and the valves are closed in summer and opened in winter;

As a preferred technical solution of the invention, the pipeline connecting the energy storage tank with the cooling water return pipe is provided with valves which are opened in winter and closed in summer; A valve is mounted on the cooling water return pipe, and is located between the connection points of the two connection pipes of the energy storage tank and the cooling water return pipe. The valve is closed in winter and opened in summer.

As a preferred technical solution of the invention, the boiler is opened when the ambient temperature is below five degrees.

Compared with existing air conditioning system in which single cold air conditioning host is equipped with cooling tower and boiler, the air conditioning cold and heat source system using the invention has the following advantages.

The system configuration is simple, the investment is less, only in the original air conditioning water system, a small number of pipelines and components are provided, which do not need to transform the original equipment and can be directly run the original equipment;

The invention extends the equipment use time, improves utilization of the single cold air conditioning host and cooling tower, and shortens the use time of the boiler;

The invention changes the use nature of the cooling towers from the original simple summer cooling effect to that whether it is sunny, night, rain and other weather conditions, the cooling tower can absorb the heat in the wet and cold air, forming all-weather solar heat-absorbing tower in the winter;

The invention combines with solar light and heat, makes full use of energy storage tank to store and use the solar energy, whether it is sunshine or not, it can be used;

The invention uses intermediate circulation system, separating the cooling water system from the evaporator so as to avoid the icing problem caused by the low concentration of the antifreeze liquid in the evaporator.

The invention uses cooling towers to circulate in the winter cycle, playing a purification role in the haze;

The invention provides reasonable arrangements for the boiler work, and fully guarantees the user's heating requirements.

BRIEF DESCRIPTION OF THE DRAWINGS

The present invention will now be described in further detail with reference to the accompanying drawings and examples:

FIG. 1 is a schematic representation of the present invention.

In the drawing, single cold air conditioning main unit 1, cooling tower 2, boiler 3, user indoor air conditioning system 4, evaporator 5, condenser 6, cooling water pump 7, chilled water pump 8, plate heat exchanger 9, secondary circulation pump 10, temperature sensor 11, controller 12, solar heat collector plate 13, energy storage tank 14.

The dashed line indicates the original pipeline, the solid line indicates the added pipeline, and the arrow indicates the flow of fluid in the pipeline.

DETAILED DESCRIPTION

As shown in the drawing, the present invention is a method and an apparatus for retrofitting an air conditioning system using an all-weather solar heating, comprising an original air conditioning system composed of a single air-conditioning host 1, a cooling tower 2, a boiler 3, a user indoor air conditioning system 4, an evaporator 5, a condenser 6, a cooling water pump 7 and a chilled water pump 8. The original air conditioning system is provided further with a plate heat exchanger 9, a secondary circulation pump 10, a temperature sensor 11, a controller 12, a solar collector plate 13, and an energy storage tank 14. The primary water inlet of the plate heat exchanger 9 is connected with the original cooling water return pipe B1 through a pipeline D1. The connection point of the pipeline D1 and the cooling water return pipe B1 is located in the pipeline between the cooling water pump 7 and the cooling water return valve C; and the primary water outlet of the plate heat exchanger 9 is connected to the original cooling water supply pipe B2 through a pipeline D2. The connection point of the pipeline D2 and the cooling water supply pipe B2 is located in the pipeline between the cooling water supply valve D and the cooling tower 2. The secondary outlet of the plate heat exchanger 9 is connected to the original chilled water return pipe A1 through a pipeline E1. The connection point of the pipeline E1 and the chilled water return pipe A1 is located in the pipeline between the chilled water return valve A and the evaporator 5. The secondary water inlet of the plate heat exchanger 9 is connected with the original chilled water supply pipe A2 through a pipeline E2. The connection point of the pipeline E2 and the chilled water supply pipe A2 is located in the pipeline between the chilled water supply valve B and the evaporator 5; The secondary circulation pump 10 is installed on the pipeline E1 connected to the secondary water outlet of the plate heat exchanger 9. A pipeline F1 is provided so that the chilled water return pipe A1 and the inlet of the condenser 6 of the single cold air conditioning host. The connecting point on the chilled water return pipe A1 is located on the pipe between the chilled water pump 8 and the chilled water return valve A. A pipeline F2 is provided so that the chilled water supply pipeline A2 is connected with the outlet of the condenser 6 of the single cold air conditioning host. The connection point on the chilled water supply line A2 is located on the pipeline behind the chilled water supply valve B; A pipeline G1 is provided between the pipeline F2 connecting the chilled water supply pipe A2 with the outlet of the condenser 6 of the single cold air conditioning host and the boiler water return pipe C1. The pipeline G3 is attached with a solenoid valve M. The connecting point of the pipeline G1 and the water return pipe C1 is located on the pipeline between the boiler water return valve E and the water inlet of the boiler; A heat collecting plate 13 is provided on the outside of tower wall of the cooling tower 2. The heat collecting plate 13 is connected with the storage tank 14 through a pipeline; The energy storage tank 14 is installed in parallel though the pipeline on the cooling water return pipe B1 located between the cooling tower 2 and the cooling water pump 7; The pipeline D2 is provided with a valve G The pipeline D1 is provided with a valve H. The pipeline E1 is provided with a valve I. The pipeline E2 is provided with a valve J. The pipeline F1 is provided with a valve K. The pipeline F2 is provided with a valve L. The pipeline G1 is provided with a valve M. The valve P and the valve Q are installed on the connection pipe between the energy storage tank 14 and the cooling water return pipe B1. The valve N is mounted on the cooling water return pipe B1, and is located between the two connection points of the connection pipes of the energy storage tank 14 and the cooling water return pipe B1.

The boiler return valve E is a solenoid valve.

The temperature sensor 11 is mounted on the chilled water return pipe A1 and is located at the water outlet of the chilled water pump 8.

The controller 12 can adjust the opening degree of the boiler return valve E and the solenoid valve M.

The pipeline E1, the pipeline E2, the pipeline D1, and the pipeline D2 connected to the plate heat exchanger are filled with antifreeze liquid.

The chilled water return valve A on the chilled water return pipe A1 and the chilled water supply valve B on the chilled water supply pipe A2 are closed in summer and opened in summer.

The cooling water return valve C on the cooling water return pipe B1 and the cooling water supply valve D on the cooling water supply pipeline B2 are closed in summer and opened in summer.

The boiler return valve E on the boiler return pipeline C1 and the boiler water supply valve F on the boiler water supply pipeline C2 are closed in summer and opened in winter.

The valves G, valves H, valves I, valves J, valves K, valves L, valves M are opened in winter and closed in summer.

The valve N is closed in the winter and is opened in summer. The valve P and the valve Q are opened in winter and closed in the summer.

The boiler is opened when the ambient temperature is below five degrees.

The present invention provides an air conditioning system retrofitting method and apparatus using all-weather solar heating has operational process as follows:

Close the chilled water return valve A, the chilled water supply valve B, the cooling water return valve C, and the cooling water supply valve D;

When the ambient temperature is above five degrees, turn off the boiler return valve E and the boiler water supply valve F;

Open valve G, valve H, valve I, valve J, valve K, valve L, and valve M;

Fill the antifreeze liquid of low concentration into the pipeline D1 and the pipeline D2, and fill the antifreeze liquid of high concentration into the pipeline E1 and the pipeline E2;

Open the cooling water pump 7 to allow the antifreeze liquid of low concentration to circulate between the cooling tower 2, the pipeline D1, the plate heat exchanger 9 and the pipeline D2;

Open the secondary circulation pump 10 to circulate the antifreeze liquid of high concentration between the plate heat exchanger 9, the pipeline E1, the evaporator 5 and the pipeline E2;

Open the fan of the cooling tower 2;

Open the chilled water pump 8 so that the user air-conditioning water circulates between the user indoor air-conditioning system 4, the pipeline A1, the pipeline F1, the pipeline B1, the condenser 6, the pipeline B2, the pipeline F2;

Open a single cold air conditioning host 1;

The compressor of the single-cooled air-conditioning host 1 performs work to transfer heat from the evaporator 5 to the condenser 6;

The antifreeze liquid of high concentration is reduced in temperature after transferring heat to the refrigerant in the evaporator 5 and then circulates to the plate heat exchanger 9 by the action of the secondary circulation pump 10 to absorb the heat of the antifreeze liquid of low concentration in the plate heat exchanger 9. After the temperature rises again, it enters into the evaporator 5 and the cycle is completed;

The antifreeze liquid of low-concentration is reduced in temperature after transferring heat to the antifreeze liquid of high concentration in the plate heat exchanger 9, and then circulates to the cooling tower 2 by the action of the cooling water pump 10, exchange the heat with the air entering into the tower in the cooling tower 2. The antifreeze liquid of low-concentration absorb the heat in the air and then the temperature rises, and then into the energy storage tank 14 for heating again. After heating, it enters into the plate heat exchanger 9 and the cycle is completed;

The solar collector 13 absorbs solar energy and heats the circulating solution in the plate. The circulating solution is heated and flows into the energy storage tank 14 to heat the energy storage material in the energy storage tank 14, and the cooling water flows back through the energy storage tank 14 and then the energy storage material is heated again, and the temperature is further improved;

During the period when the cooling tower 2 and the cooling water pump 7 are stopped, the energy storage material in the storage tank stores the solar light and heat;

The user air-conditioning water is reduced in temperature in the user indoor air-conditioning system 4 after transferring heat to the indoor air and circulated to the condenser 6 under the action of the chilled water pump 8 to absorb the heat of the refrigerant in the condenser 6. After the temperature rises, it enters into the user indoor air conditioning system 4 again and the cycle is completed;

In the above process, the heat required by the user indoor air conditioning system 4 is entirely derived from the heat in the outside air extracted by the cooling tower extracted from the single cold air conditioning host 1 and the solar light heat absorbed in the solar heat collecting plate;

When the outdoor temperature is less than five degrees, the temperature sensor 11 installed on the pipeline A1 senses that the user has a low return water temperature, turns on the boiler 3, closes the valve L, opens the boiler water supply valve F on the boiler water supply pipeline C2, open the valve M on the pipeline G1 by the controller 12, open the boiler water return valve E on the boiler water return pipe C1 by the controller 12, and controls the opening degree of the valve M and the valve E by the controller according to the return water temperature. In the process, the heat required by the user indoor air conditioning system 4 is partly from the heat extracted by the single cold air conditioning host 1 and solar heat in the outside air, and partly from the heat generated by the combustion of the boiler 3.

As described above, only the specific embodiments of the present invention are described, but the scope of the present invention is not limited thereto. Any person skilled in the art, within the technical scope of the present invention, may modify without inventive work. Such modification is covered within the scope of the present invention. Accordingly, the scope of protection of the present invention should be based on the scope defined by the claims.

What is claimed is:

1. An air conditioning system comprising:
a single cold air conditioning host, a cooling tower, a boiler, a user indoor air conditioning system, a evaporator, a condenser, a cooling water pump, a chilled water pump, a plate heat exchanger, a secondary circulation pump, a temperature sensor, a controller, a cooling water return pipe, a first pipeline, a cooling water return valve, a cooling water supply pipe, a second pipeline, a cooling water supply valve, a chilled water return pipe, a third pipeline, a chilled water return valve, a chilled water supply pipe, a fourth pipeline, a chilled water supply valve, a fifth pipeline, a sixth pipeline, a seventh pipeline, a boiler water return pipe, and a boiler return valve, wherein a primary water inlet of the plate heat exchanger is connected to the cooling water return pipe through the first pipeline, and the connection point of the first pipeline and the cooling water return pipe is located in a pipeline between the cooling water pump and the cooling water return valve;

a primary water outlet of the plate heat exchanger is connected to the cooling water supply pipe through the second pipeline, and the connecting point of the second pipeline and the cooling water supply pipe is located in a pipeline between the cooling water supply valve and the cooling tower;

a secondary water outlet of the plate heat exchanger is connected to the chilled water return pipe through the third pipeline, and the connection point of the third pipeline and the chilled water return pipe is located in a pipeline between the chilled water return valve and the evaporator;

a secondary water inlet of the plate heat exchanger is connected to the chilled water supply pipe through the fourth pipeline, and the connection point of the fourth pipeline and the chilled water supply pipe is located in a pipeline between the chilled water supply valve and the evaporation;

a secondary circulation pump is mounted on the third pipeline connected to the secondary water outlet of the plate heat exchanger;

the fifth pipeline is provided so that the chilled water return pipe is connected to the water inlet of the condenser of the single-cold air conditioning host, and the connection point of the fifth pipeline and the chilled water return pipe is located in a pipeline between the chilled water pump and the chilled water return valve;

the sixth pipeline is provided so that the chilled water supply pipe is connected to the water outlet of the condenser of the single cold air conditioning host, and the connection point of the sixth pipeline and the chilled water supply pipe is located in a pipeline behind the chilled water supply valve; and the seventh pipeline is provided between the sixth pipeline connecting the chilled water supply pipe and the water outlet of the condenser of the single-cold-air-conditioning host and the boiler water return pipe, a solenoid valve is mounted on the seventh pipeline, and the connection point of the seventh pipeline and the boiler water inlet pipe is located in a pipeline between the boiler return valve and the water inlet of the boiler.

2. The air conditioning system according to claim 1, wherein a solar heat collecting plate is provided on the outside of the tower wall of the cooling tower, and the solar heat collecting plate is connected with an energy storage tank through a first plurality of pipelines, and the energy storage tank is installed on the cooling water return pipe between the cooling tower and the cooling water pump through a second plurality of pipelines.

3. The air conditioning system according to claim 1, wherein said temperature sensor is mounted on the chilled water return pipe and is located at the water outlet of the chilled water pump.

4. The air conditioning system according to claim 1, wherein said controller is capable of adjusting the opening degree of the boiler return valve and the solenoid valve.

5. The air conditioning system according to claim 1, wherein the third pipeline, the fourth pipeline, the first pipeline, and the second pipeline are filled with antifreeze liquid.

\* \* \* \* \*